United States Patent
Kumar et al.

(10) Patent No.: US 12,146,687 B2
(45) Date of Patent: Nov. 19, 2024

(54) PRESSURE REGULATOR AND METHOD OF USING THE SAME

(71) Applicant: GOODRICH CORPORATION, Charlotte, NC (US)

(72) Inventors: Yasasvi Harish Kumar, Karnataka (IN); Skandan Berikai Kuppan, Karnataka (IN); Satya Swaroop Panda, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 1319 days.

(21) Appl. No.: 16/787,554

(22) Filed: Feb. 11, 2020

(65) Prior Publication Data

US 2021/0180710 A1 Jun. 17, 2021

(30) Foreign Application Priority Data

Dec. 13, 2019 (IN) .............................. 201911051819

(51) Int. Cl.
| | |
|---|---|
| *G05D 16/02* | (2006.01) |
| *C01C 1/04* | (2006.01) |
| *F24V 30/00* | (2018.01) |
| *G05D 16/00* | (2006.01) |

(52) U.S. Cl.
CPC ................ *F24V 30/00* (2018.05); *C01C 1/04* (2013.01); *G05D 16/024* (2019.01)

(58) Field of Classification Search
CPC .......... G05D 16/024; F24V 30/00; C01C 1/04
See application file for complete search history.

(56) References Cited

U.S. PATENT DOCUMENTS

| | | | | |
|---|---|---|---|---|
| 3,662,739 | A | * | 5/1972 | Schroder .................. F02G 1/055 |
| | | | | 126/263.01 |
| 5,261,597 | A | | 11/1993 | Perlman et al. |
| 6,050,292 | A | * | 4/2000 | Richman ............. F16K 31/1266 |
| | | | | 137/510 |
| 6,877,698 | B2 | | 4/2005 | Baker et al. |
| 8,307,843 | B2 | | 11/2012 | Patterson et al. |
| 8,833,078 | B2 | | 9/2014 | Galloway et al. |
| 8,920,753 | B2 | | 12/2014 | Park et al. |
| 2020/0032787 | A1 | * | 1/2020 | Zediu .................... F04B 49/035 |

* cited by examiner

*Primary Examiner* — P. Macade Nichols
(74) *Attorney, Agent, or Firm* — CANTOR COLBURN LLP

(57) ABSTRACT

Disclosed is a pressure regulator, comprising: a first cylindrical chamber; a second cylindrical chamber located concentrically within the first cylindrical chamber and in thermal communication with the first cylindrical chamber; and further comprising at least one of: an internal valve, wherein the internal valve is connected at a first end to the first cylindrical chamber and at a second end to the second cylindrical chamber, wherein the internal valve allows the flow of gas from the second cylindrical chamber to the first cylindrical chamber; and an external gas chamber and an external valve, wherein the external gas chamber is located outside the first cylindrical chamber, wherein the external valve is connected at a first end to the first cylindrical chamber and at a second end to the external gas chamber, wherein the external valve allows the flow of gas from the external gas chamber to the first cylindrical chamber.

20 Claims, 3 Drawing Sheets

PRESSURE REGULATOR AND METHOD OF USING THE SAME

BACKGROUND

Exemplary embodiments pertain to the art of pressure regulation, and more particularly, to pressure regulators and methods of using the same.

Pressure regulators are devices that reduce the input pressure of a fluid or gas to a desired output pressure value. Pressure regulators can be found in various aircraft applications. For example, a pressure regulator can be used as a cabin pressure regulator, a canopy seal pressure regulator, a potable water system pressure regulator, or a waveguide pressure regulator.

However, the drop in temperature across the pressure regulator can result in the freezing of gases within the device. For example, carbon dioxide gas within the pressure regulator can freeze to form dry ice. Use of the pressure regulator in a cold environment will exaggerate ice formation. The presence of ice, for example, near an outlet orifice, can disrupt the pressure and fluid flow of gas within the device.

Therefore, there is a need to develop a pressure regulator, and method of using the same, which avoids excessive temperature drop, ice formation, pressure disruption, and fluid flow disruption.

BRIEF DESCRIPTION

Disclosed is a pressure regulator, comprising: a first cylindrical chamber; and a second cylindrical chamber located concentrically within the first cylindrical chamber, wherein the first cylindrical chamber is in thermal communication with the second cylindrical chamber; wherein the pressure regulator further comprises at least one of: an internal valve, wherein the internal valve is connected at a first end to the first cylindrical chamber and at a second end to the second cylindrical chamber, and wherein the internal valve is configured to allow the flow of gas from the second cylindrical chamber to the first cylindrical chamber; and an external gas chamber and an external valve, wherein the external gas chamber is located outside the first cylindrical chamber, and wherein the external valve is connected at a first end to the first cylindrical chamber and at a second end to the external gas chamber, wherein the external valve is configured to allow the flow of gas from the external gas chamber to the first cylindrical chamber.

Also disclosed is a method of using the pressure regulator, the method comprising: passing hydrogen gas through the first cylindrical chamber; passing carbon dioxide gas and nitrogen gas through the second cylindrical chamber; passing at least a portion of the nitrogen gas from the second cylindrical chamber to the first cylindrical chamber via the internal valve, passing at least a portion of a nitrogen gas from the external gas chamber to the first cylindrical chamber via the external valve, or any combination(s) thereof; and contacting the hydrogen gas and the nitrogen gas within the first cylindrical chamber, thereby creating an ammonia gas via an exothermic chemical reaction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed pressure regulator and method are presented herein by way of exemplification and not limitation with reference to the Figures.

Figure 1:
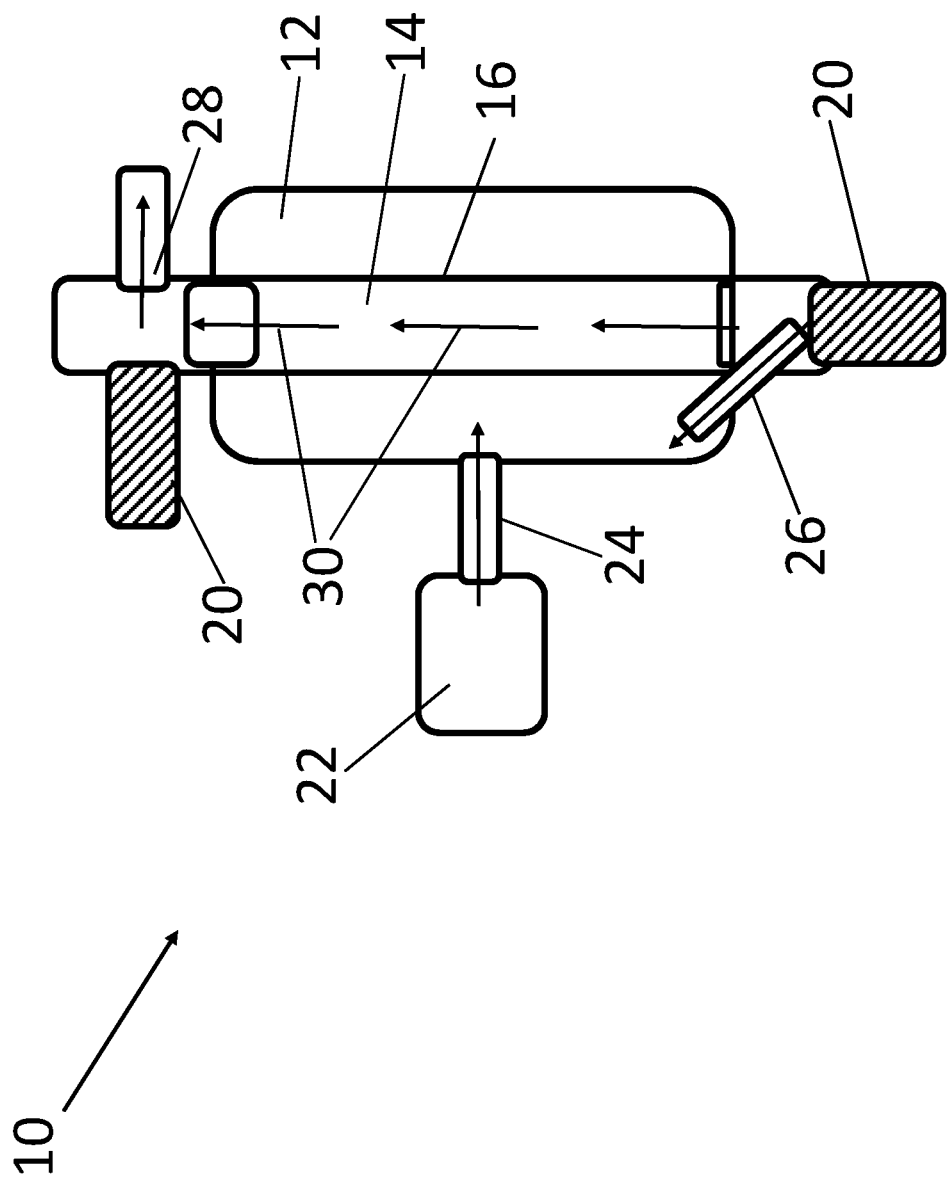
FIG. 1 is a simplified diagram of a cross-sectional side view of a pressure regulator according to an exemplary embodiment.
Figure 2:
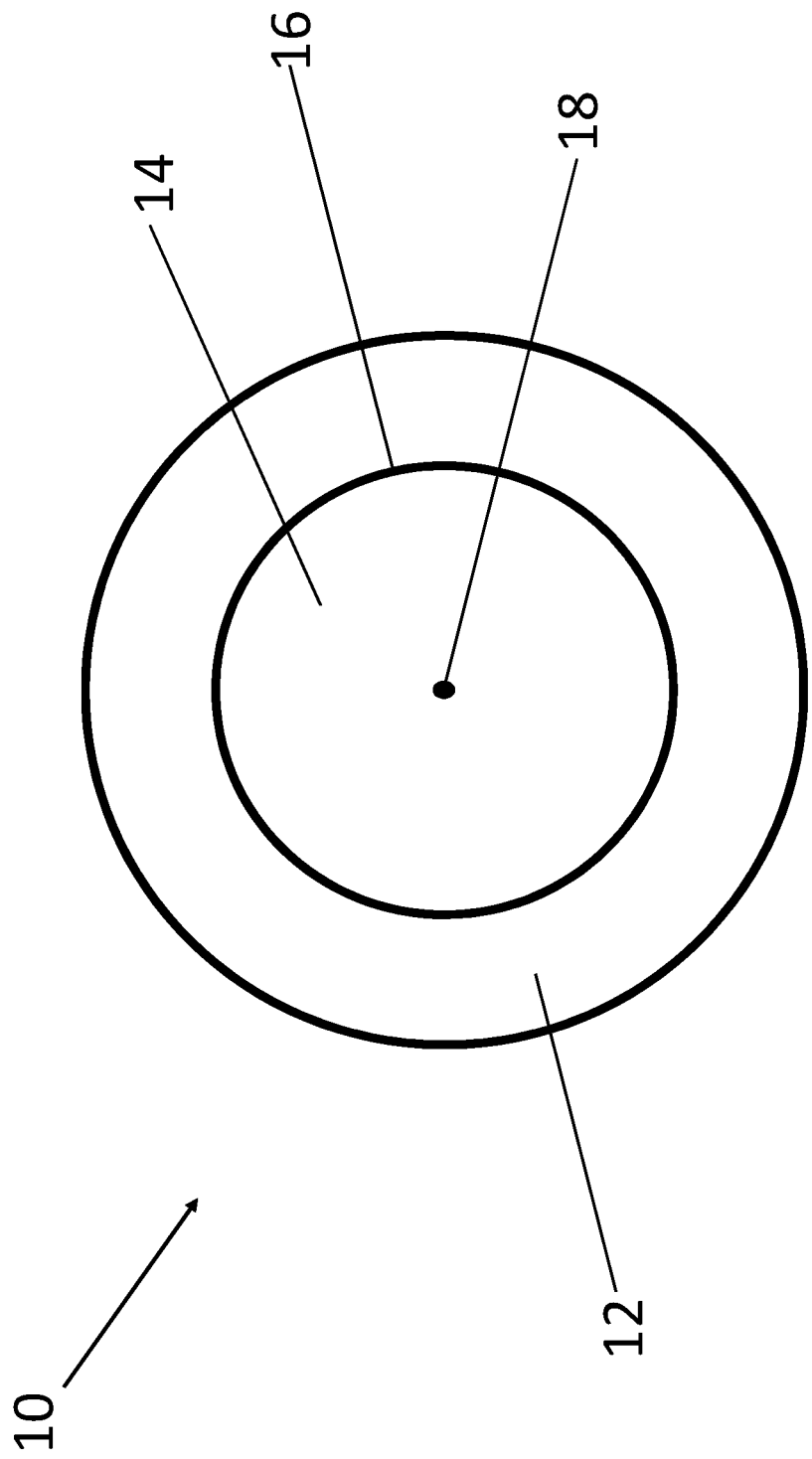
FIG. 2 is a simplified diagram of a cross-sectional top-down view of a pressure regulator according to an exemplary embodiment.

Referring to FIG. 1 and FIG. 2, a pressure regulator 10, according to one embodiment, can comprise a first cylindrical chamber 12 and a second cylindrical chamber 14. The second cylindrical chamber 14 can be located concentrically within the first cylindrical chamber 12. "Concentrically" can refer to circles, cylinders, or other shapes which share the same center point, or shapes which share approximately the same center point (i.e., the center points may be the same, or the center points may be slightly offset from each other). For example, see center point 18 as shown in FIG. 2. The first cylindrical chamber 12 can be in thermal communication with the second cylindrical chamber 14. In other words, heat can be transferred between the first cylindrical chamber 12 and the second cylindrical chamber 14, for example, via conduction and/or convection. In one embodiment, the pressure regulator 10 can comprise an intermediate layer 16 located concentrically between the first cylindrical chamber 12 and the second cylindrical chamber 14.

According to an embodiment, the first cylindrical chamber 12 can be at least partially filled with hydrogen gas. The second cylindrical chamber 14 can be at least partially filled with a combination of carbon dioxide gas and nitrogen gas. For example, the second cylindrical chamber 14 can be at least partially filled with air, for example, ambient air, engine bleed air from an aircraft engine, or any combination(s) thereof.

According to an embodiment, the second cylindrical chamber 14 can comprise an outlet orifice 28. The outlet orifice 28 can be configured to allow the flow of gas (e.g., as indicated by the flow arrow seen in FIG. 1) out of the pressure regulator 10. For example, the outlet orifice 28 can comprise an outlet valve, wherein the outlet valve is a globe valve, butterfly valve, poppet valve, or any combinations(s) thereof.

According to an embodiment, the pressure regulator 10 can comprise an internal valve 26. The internal valve 26 can be connected at a first end to the first cylindrical chamber 12 and at a second end to the second cylindrical chamber 14. The internal valve 26 can be configured to allow the flow of gas (e.g., as indicated by the flow arrow seen in FIG. 1) from the second cylindrical chamber 14 to the first cylindrical chamber 12. The internal valve 26 can be, for example, a one-way valve. A "one-way" valve can refer to a valve that allows flow in only one direction.

In addition to the internal valve 26, or alternatively, the pressure regulator 10 can comprise an external gas chamber 22 and an external valve 24. The external gas chamber 22 can be located outside the first cylindrical chamber 12. The external valve 24 can be connected at a first end to the first cylindrical chamber 12 and at a second end to the external gas chamber 22. The external valve 24 can be configured to allow the flow of gas (e.g., as indicated by the flow arrow seen in FIG. 1) from the external gas chamber 22 to the first cylindrical chamber 12. The external valve 22 can be, for example, a one-way valve. The external gas chamber 22 can be at least partially filled with nitrogen gas.

The first cylindrical chamber 12, the second cylindrical chamber 14, the intermediate layer 16, the internal valve 26, the external valve 24, the external gas chamber 22, or any combination(s) thereof can comprise metal. For example, the metal can be aluminum, stainless steel, or any combination(s) thereof.

According to an embodiment, the pressure regulator 10 can comprise one or more loading mechanisms 20. The loading mechanisms 20 can be in mechanical communication with the second cylindrical chamber 14. The loading mechanisms 20 can apply force as needed to regulate pressure and flow within the system. For example, a loading mechanism 20 can be a weight, a spring, a piston actuator, a diaphragm actuator, or any combination(s) thereof. The loading mechanisms 20 can also serve as measuring mechanisms. For example, loading mechanisms 20 can be in mechanical communication with the second cylindrical chamber 14 and be configured to measure a gas pressure, a gas flowrate, or any combination(s) thereof within the second cylindrical chamber 14. The flow of gas is indicated by the flow arrows seen in FIG. 1.

An aircraft can comprise the pressure regulator 10. For example, the pressure regulator 10 can be a cabin pressure regulator, a canopy seal pressure regulator, a potable water system pressure regulator, a waveguide pressure regulator, or any combination(s) thereof.

Figure 3:
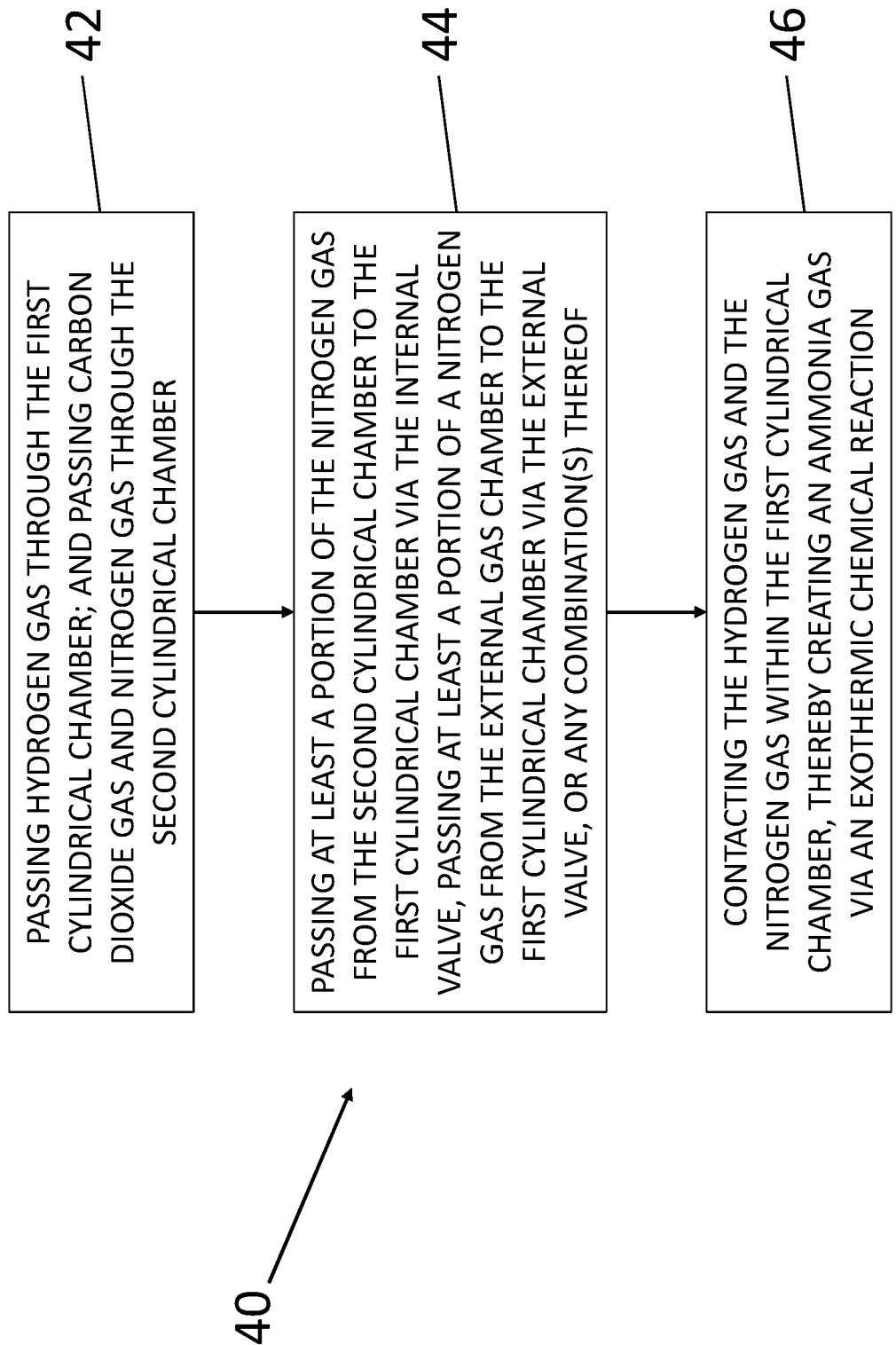
FIG. 3 is a method flow chart for a method of using a pressure regulator according to an exemplary embodiment.

Referring to FIG. 3, a method 40 of using the pressure regulator 10, according to one embodiment, comprises step 42: passing hydrogen gas through the first cylindrical chamber 12; and passing carbon dioxide gas and nitrogen gas through the second cylindrical chamber 14. The flow of gas is indicated by the flow arrows seen in FIG. 1.

The method 40 of using the pressure regulator 10 further comprises step 44: passing at least a portion of the nitrogen gas from the second cylindrical chamber 14 to the first cylindrical chamber 12 via the internal valve 26, passing at least a portion of a nitrogen gas from the external gas chamber 22 to the first cylindrical chamber 12 via the external valve 24, or any combination(s) thereof. The flow of gas is indicated by the flow arrows seen in FIG. 1.

The method 40 of using the pressure regulator 10 further comprises step 46: contacting the hydrogen gas and the nitrogen gas within the first cylindrical chamber 12, thereby creating an ammonia gas via an exothermic chemical reaction. An "exothermic reaction" can refer to a chemical reaction that releases energy through light or heat. Not wishing to be bound by theory, the heat released by the ammonia reaction can be transferred via conduction and/or convection from the first cylindrical chamber 12 to the second cylindrical chamber 14. In this way, via the transfer of this excess heat, the pressure regulator 10 disclosed herein, and method 40 of using the same, can avoid excessive temperature drop, ice formation, pressure disruption, and fluid flow disruption. Because the first cylindrical chamber 14 can be at least partially hollow, it can also maintain or even reduce a total weight of the pressure regulator 10.

According to an embodiment, an amount of heat energy released by the exothermic chemical reaction can be greater than or equal to about 50 kilojoules, for example, greater than or equal to about 65 kilojoules, for example, greater than or equal to about 80 kilojoules, for example, greater than or equal to about 90 kilojoules, for example, greater than or equal to about 100 kilojoules. A temperature within the second cylindrical chamber 14 can be about 100 Kelvin to about 300 Kelvin, for example, about 150 Kelvin to about 250 Kelvin, for example, about 175 Kelvin to about 225 Kelvin. A gas flowrate within the second cylindrical chamber 14 can be about 0.01 kilograms per second to about 0.35 kilograms per second, for example, about 0.05 kilograms per second to about 0.3 kilograms per second, for example, about 0.1 kilograms per second to about 0.25 kilograms per second, for example, about 0.15 kilograms per second to about 0.2 kilograms per second.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A pressure regulator, comprising:
a first cylindrical chamber; and
a second cylindrical chamber located concentrically within the first cylindrical chamber, wherein the first cylindrical chamber is in thermal communication with the second cylindrical chamber;
wherein the pressure regulator further comprises at least one of:
an internal valve, wherein the internal valve is connected at a first end to the first cylindrical chamber and at a second end to the second cylindrical chamber, and wherein the internal valve is configured to allow the flow of gas from the second cylindrical chamber to the first cylindrical chamber; and
an external gas chamber and an external valve, wherein the external gas chamber is located outside the first cylindrical chamber, and wherein the external valve is connected at a first end to the first cylindrical chamber and at a second end to the external gas chamber, wherein the external valve is configured to allow the flow of gas from the external gas chamber to the first cylindrical chamber.

2. The pressure regulator of claim 1, wherein the first cylindrical chamber is at least partially filled with hydrogen gas.

3. The pressure regulator of claim 1, wherein the second cylindrical chamber is at least partially filled with carbon dioxide gas and nitrogen gas.

4. The pressure regulator of claim 1, wherein the pressure regulator comprises an internal valve, wherein the internal valve is connected at a first end to the first cylindrical chamber and at a second end to the second cylindrical chamber, and wherein the internal valve is configured to allow the flow of gas from the second cylindrical chamber to the first cylindrical chamber.

5. The pressure regulator of claim 4, wherein the internal valve is a one-way valve.

6. The pressure regulator of claim 1, wherein the pressure regulator comprises an external gas chamber and an external valve, wherein the external gas chamber is located outside the first cylindrical chamber, and wherein the external valve is connected at a first end to the first cylindrical chamber and at a second end to the external gas chamber, wherein the external valve is configured to allow the flow of gas from the external gas chamber to the first cylindrical chamber.

7. The pressure regulator of claim 6, wherein the external valve is a one-way valve.

8. The pressure regulator of claim 6, wherein the external gas chamber is at least partially filled with nitrogen gas.

9. The pressure regulator of claim 1, wherein the first cylindrical chamber, the second cylindrical chamber, the internal valve, the external valve, the external gas chamber, or any combination(s) thereof comprise metal.

10. The pressure regulator of claim 9, wherein the metal is aluminum, stainless steel, or any combination(s) thereof.

11. The pressure regulator of claim 1, wherein the second cylindrical chamber comprises an outlet orifice configured to allow the flow of gas out of the pressure regulator.

12. The pressure regulator of claim 11, wherein the outlet orifice comprises an outlet valve, wherein the outlet valve is a globe valve, butterfly valve, poppet valve, or any combinations(s) thereof.

13. The pressure regulator of claim 1, further comprising an intermediate layer located concentrically between the first cylindrical chamber and the second cylindrical chamber.

14. The pressure regulator of claim 1, further comprising a loading mechanism in mechanical communication with the second cylindrical chamber, wherein the loading mechanism is a weight, a spring, a piston actuator, a diaphragm actuator, or any combination(s) thereof.

15. The pressure regulator of claim 1, further comprising a measuring mechanism in mechanical communication with the second cylindrical chamber and configured to measure a gas pressure, a gas flowrate, or any combination(s) thereof within the second cylindrical chamber.

16. An aircraft comprising the pressure regulator of claim 1, wherein the pressure regulator is a cabin pressure regulator, a canopy seal pressure regulator, a potable water system pressure regulator, a waveguide pressure regulator, or any combination(s) thereof.

17. A method of using the pressure regulator of claim 1, the method comprising:
   passing hydrogen gas through the first cylindrical chamber;
   passing carbon dioxide gas and nitrogen gas through the second cylindrical chamber;
   passing at least a portion of the nitrogen gas from the second cylindrical chamber to the first cylindrical chamber via the internal valve, passing at least a portion of a nitrogen gas from the external gas chamber to the first cylindrical chamber via the external valve, or any combination(s) thereof; and
   contacting the hydrogen gas and the nitrogen gas within the first cylindrical chamber, thereby creating an ammonia gas via an exothermic chemical reaction.

18. The method of claim 17, wherein an amount of heat energy released by the exothermic chemical reaction is greater than or equal to about 80 kilojoules.

19. The method of claim 17, wherein a temperature within the second cylindrical chamber is about 100 Kelvin to about 300 Kelvin.

20. The method of claim 17, wherein a gas flowrate within the second cylindrical chamber is about 0.01 kilograms per second to about 0.35 kilograms per second.

* * * * *